United States Patent [19]
Diehl et al.

[11] Patent Number: 5,374,993
[45] Date of Patent: Dec. 20, 1994

[54] IMAGE SKEW ADJUSTMENT FOR A RASTER OUTPUT SCANNING (ROS) SYSTEM

[75] Inventors: Michael J. Diehl, Ontario; Walter A. Gill, Victor; Mark R. Halvonik; Floyd D. James, both of Rochester; Bradley D. Larson, Ontario; Leonard N. O'Connor, Webster, all of N.Y.

[73] Assignee: Xerox Corporation, Stamford, Conn.

[21] Appl. No.: 769,311

[22] Filed: Oct. 1, 1991

[51] Int. Cl.5 .................. H04N 1/29; G01D 9/42; G03G 21/00
[52] U.S. Cl. ............................ 358/300; 346/108; 355/204
[58] Field of Search ........... 358/300; 346/108, 139 R, 346/160; 355/204, 207

[56] References Cited

U.S. PATENT DOCUMENTS

| | | | |
|---|---|---|---|
| 4,268,165 | 5/1981 | Bradman | 355/204 |
| 4,297,713 | 10/1981 | Ichikawa et al. | 346/108 |
| 4,620,288 | 10/1986 | Welmers | 382/1 X |
| 4,796,038 | 1/1989 | Allen et al. | 346/108 X |
| 4,819,018 | 4/1989 | Moyroud et al. | 346/108 X |
| 4,831,420 | 5/1989 | Walsh et al. | 355/204 X |
| 4,977,412 | 12/1990 | Komori et al. | 346/108 |
| 4,978,849 | 12/1990 | Goddard et al. | 346/108 X |
| 5,072,239 | 12/1991 | Mitcham et al. | 346/108 |
| 5,153,608 | 10/1992 | Genovese | 346/108 |
| 5,214,441 | 5/1993 | Blanding et al. | 346/108 X |
| 5,257,048 | 10/1993 | Genovese | 346/160 |

Primary Examiner—Benjamin R. Fuller
Assistant Examiner—Eric Frahm

[57] ABSTRACT

A procedure is provided for adjusting for image line skew caused by tolerance accumulation between a Raster Output Scanning (ROS) assembly and a photoreceptor which is being scanned. The ROS housing is adjustably mounted in relation to the photoreceptor, so that incremental adjustments can be made to cause the output scan lines emerging from the ROS housing to be moved in the process or reverse process direction vis-a-vis the photoreceptor. A test print is generated which provides measurable scan delineators to identify the amount of scan line skew created by a photoreceptor misalignment. The measured scan line skew alignment is correlated with adjustments made by a hex head screw to provide a very precise alignment. The effective adjustment range is ±4 mm in the process direction which corresponds to ±6.3 milliradians of scan line skew.

6 Claims, 8 Drawing Sheets

IMAGE SKEW ADJUSTMENT FOR A RASTER OUTPUT SCANNING (ROS) SYSTEM

BACKGROUND OF THE INVENTION

The present invention is generally directed towards an improved mounting for a ROS housing containing the optical components used to direct a modulated scanning beam onto the surface of a photoreceptor, and, more particularly, to a means and method for compensating for scan line (image) skew errors due to photoreceptor-to-ROS misalignment.

Printing systems utilizing a ROS to form images on a photoreceptor surface are well known in the art. Conventionally, the ROS includes a diode or gas laser for generating a coherent beam of radiation; a modulator for modulating the laser output in accordance with an input video image signal; and a multifaceted polygon scanner for scanning the modulated laser beam output line by line, across the surface of the photoreceptor to form the latent image. Also included in the ROS are various optical components to collimate, expand, focus, and align the modulated scanning beams. These optical components are fixedly mounted within a housing frame, which is positioned within a printer machine frame, so that the modulated and shaped scanning beams emerging from a window in the housing are directed in a scan line which is perpendicular to the photoreceptor surface. The lines will be formed in parallel across the surface of the photoreceptor belt. The belt should be aligned so that these parallel lines are formed perpendicular to the direction of belt travel. It is difficult to achieve this perpendicularity, resulting in a condition referred to as "scan line skew", wherein the image effectively takes the form of a parallelogram. This condition will affect the images which are subsequently developed and transferred to output prints, the output prints exhibiting degradation of quality due to the skew effects.

SUMMARY OF THE INVENTION

In accordance with the invention, there is provided a means and method for an initial, and for a subsequent adjustment, where necessary, of a ROS unit, so that the scan skew is practically eliminated. In the preferred embodiment, a memory-resident, digitized test pattern is printed which exhibits the scan line skew in fine increments. Measurements are taken which are correlated with adjustments to be made to the ROS housing positioning to cause the housing to be pivoted towards or away from the process direction of the photoreceptor belt. In other words, the ROS unit is aligned so that the orientation of the output scan beams is correlated to whatever skew has been measured in the photoreceptor which is being scanned. More particularly, the present invention is directed towards a method for compensating for scan line (image) skew in a printing machine incorporating a Raster Output Scanning (ROS) system containing a plurality of optical components including the steps of:

(a) positioning the optical components of the ROS within a housing, (b) securing the housing to a printing machine frame at a plurality of mounting locations including at least a first, top, inboard pivotable location, and a second, top, outboard mount, laterally adjustable location, (c) positioning a photoreceptor member adjacent the ROS housing so that the ROS output beams are formed in successive, parallel scan lines along the width of said photoreceptor, said photoreceptor being adapted to move in a process direction, (e) applying a skew test pattern signal to the ROS to create a latent test pattern image on the surface of said photoreceptor, (f) developing said latent image and transferring said developed image to a copy sheet, (g) fusing said copy sheet to create a final test pattern print having a plurality of lead edge and registration edge skew delineators, (h) calculating lead edge and registration edge skew, (i) subtracting registration edge skew from lead edge skew to determine resultant scan line skew which represents a skewing of the photoreceptor in either the process or reverse process direction, and (j) laterally adjusting said top outboard mount location.

DESCRIPTION OF THE INVENTION

Figure 1:
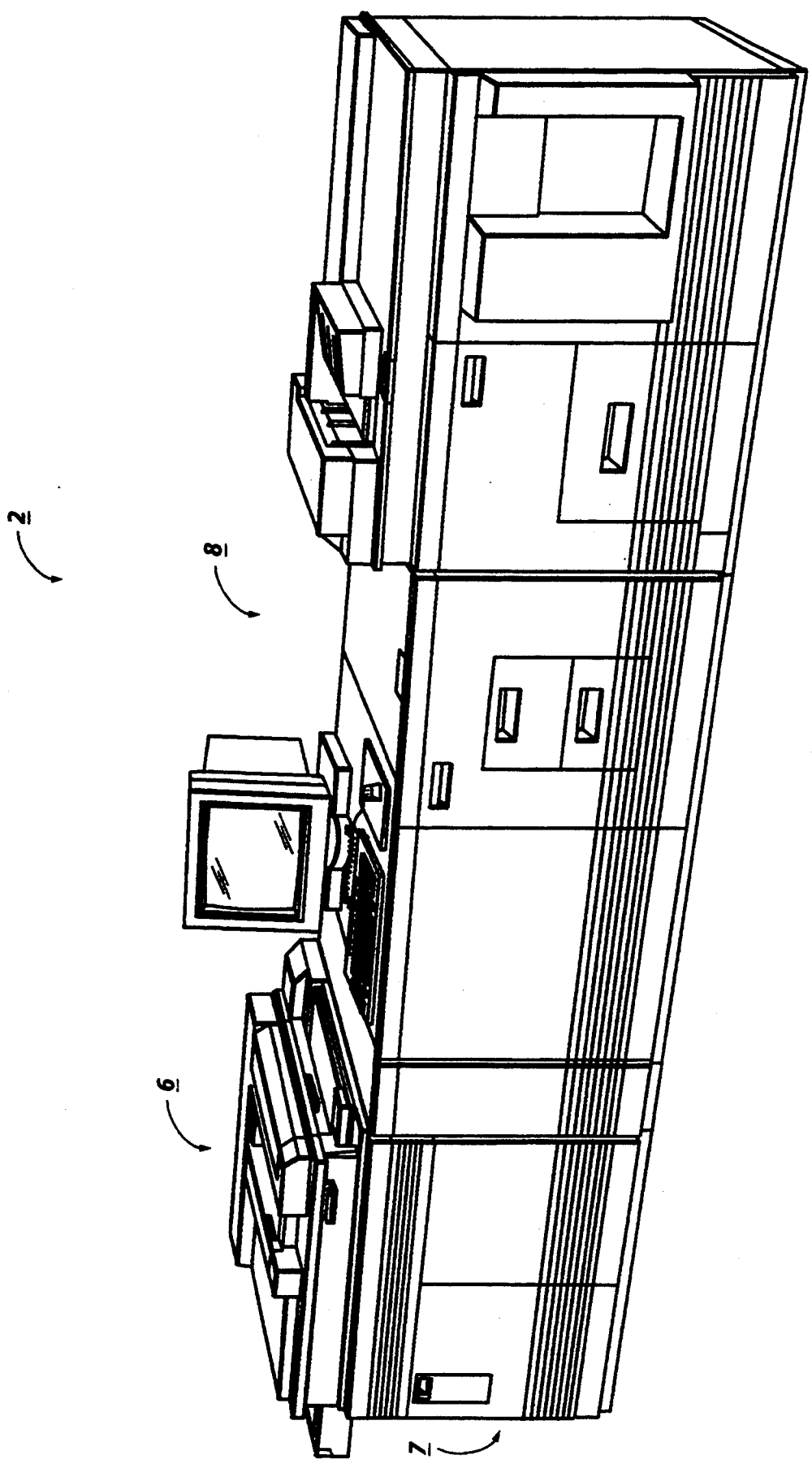
FIG. 1 is a view depicting an electronic printing system having a printer section which includes the ROS assembly mounted according to the present invention.
Figure 2:
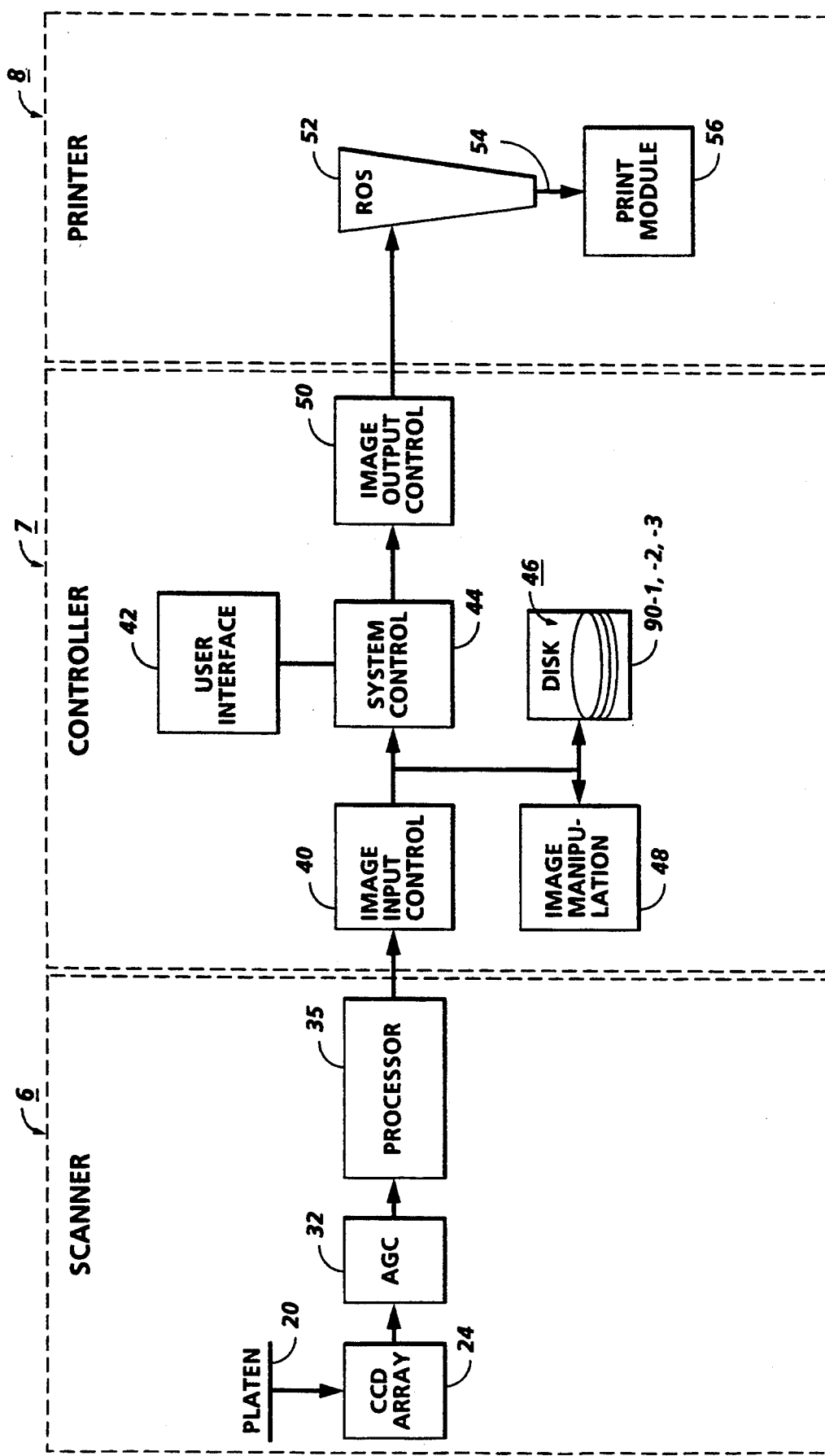
FIG. 2 is a block diagram depicting the major elements of the printing system shown in FIG. 1.

Referring to FIGS. 1 and 2, there is shown an exemplary laser based printing system 2, divided into a scanner section 6, controller section 7, and printer section 8. The adjustable ROS housing mounting to be discussed below is associated with printer section 8.

Figure 3:
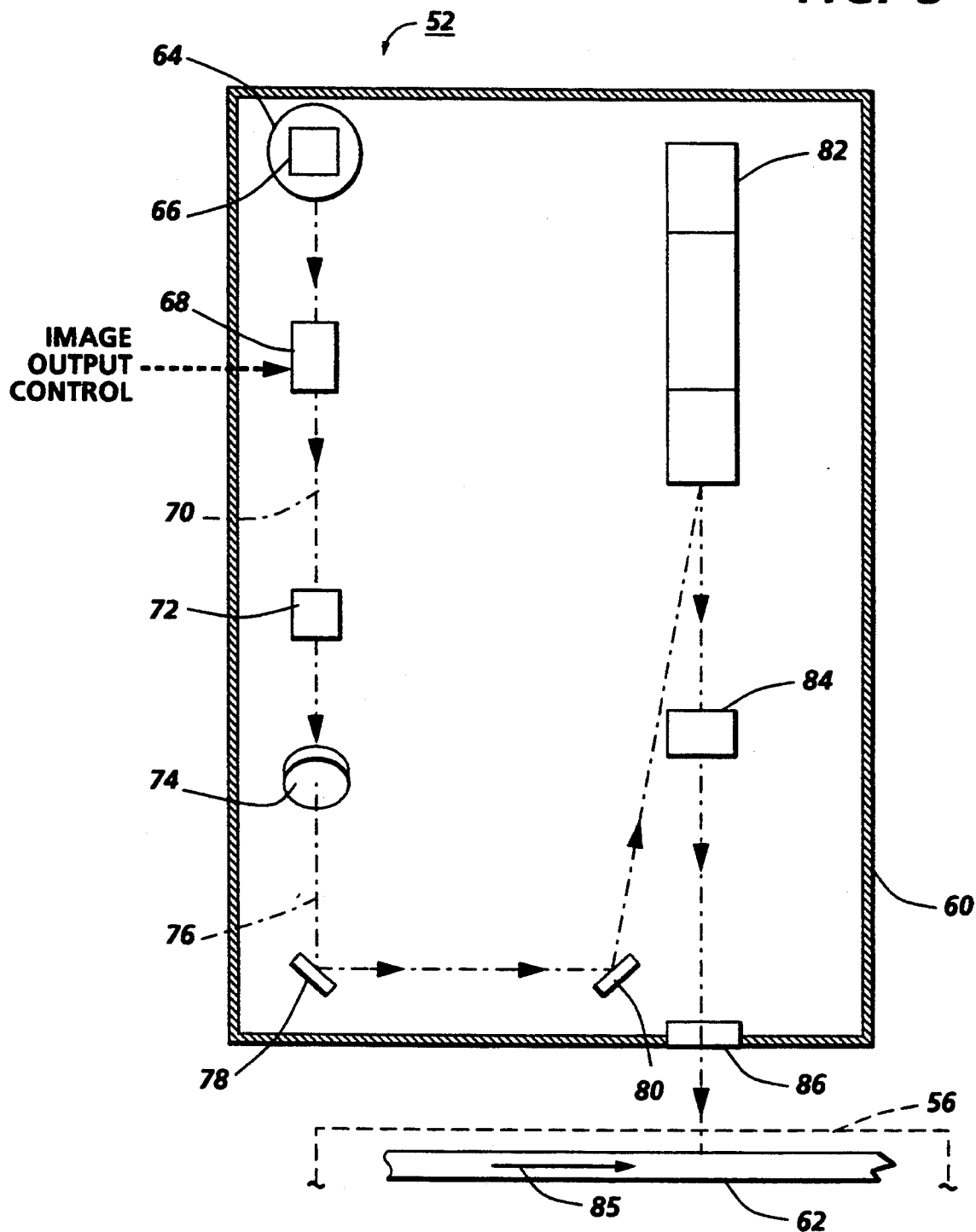
FIG. 3 is an interior view of the ROS housing of FIG. 2 showing the optical components contained therein.

Referring particularly to FIGS. 2 and 3, scanner section 6 incorporates a transparent platen 20 on which a document to be scanned is located. One or more linear arrays 24 are supported in CCD array 24 for reciprocating scanning movement below platen 20. An optical assembly (not shown) directs a narrow beam of high intensity light onto an incremental area of the platen. The reflected illumination lines from platen 20 and the document being scanned are focused onto array 24. Array 24, which may comprise a two row CCD photo sensor, is illuminated by the focused band of illumination and generates image signals or pixels representative of the image scanned, which after suitable processing by automatic gain control circuit 32 and processor 35, are outputted to controller section 7.

Processor 35 converts the analog image signal outputs of array 24 to digital signals and processes the digital image signals as required to enable system 2 to store and handle the image data in the form required to carry out the job programmed. Processor 35 also provides enhancements and changes to the image signals such as filtering, thresholding, screening, cropping, reduction/enlarging, etc. Referring to FIG. 2, controller section 7 is, for explanation purposes, divided into an image input controller 40, user interface (UI) 42, system controller 44, main memory 46, image manipulation section 48, and image output controller 50. The scanned image data input from processor 35 of scanner section 6 is operated on by controller section 7. The output of controller 7 operates a Raster Output Scanner (ROS) 52 in printer 8. ROS 52 consists of a housing frame, described in detail below, which houses a laser, modulator, polygon scanner, and other optical elements required to focus and direct output beams 54, which are in turn scanned across a moving photoreceptor located in print module 56. Image lines are exposed at the photoreceptor with each scan to create a latent electrostatographic image of the document being imaged. The latent image can then be developed and transferred to a copy sheet with the transferred image being fused. A further, more detailed description of the exemplary printing system 2 is found in co-pending U.S. Ser. No. 07/546,617, U.S. Pat. No. 5,164,842 assigned to the same assignee as the present invention, whose contents are incorporated by reference.

According to the present invention, and referring to FIG. 3, ROS unit 52 consists of a modular housing 60, within which are mounted the optical components which generate the scan lines at the surface of a photoreceptor belt 62, housed in print module 56. As shown in FIG. 3, these components include a laser 64 which generates a collimated beam of monochromatic light. The monochromatic light beam is reflected by first mirror 66 onto modulator 68, the light beam being modulated in conformance with the information contained in the video signal sent from image output control 50. Modulator 68 may be any suitable acousto-optic or electro-optical modulator for recording the video information in the form of a modulated light beam, at the output of the modulator. By means of the modulator, the information within the video signal is represented by the modulated light beam 70. Light beam 70 is reflected by second mirror 72 and is incident on imaging lens 74. Imaging lens 74 produces a beam 76, which is reflected by third and fourth mirrors 78 and 80, and impinges upon a plurality of contiguous facets of scanning polygon 82. The beams reflected from polygon 82 are directed through post-polygon conditioning optics 84, and then through window 86 to form successive, parallel output raster lines at belt 62, moving in the direction of arrow 85.

As described above, if the photoreceptor belt is skewed in the process direction, the scanned line will not be perpendicular to the belt edges or parallel to the lead edge of the images in the process direction. The resulting output prints will exhibit copy quality defects resulting from the scan line skew.

According to the present invention, the ROS housing 60 is mounted within printer section 8 in such a way as to enable adjustment of the housing components to compensate for the housing-to-belt skew.

Figure 4:
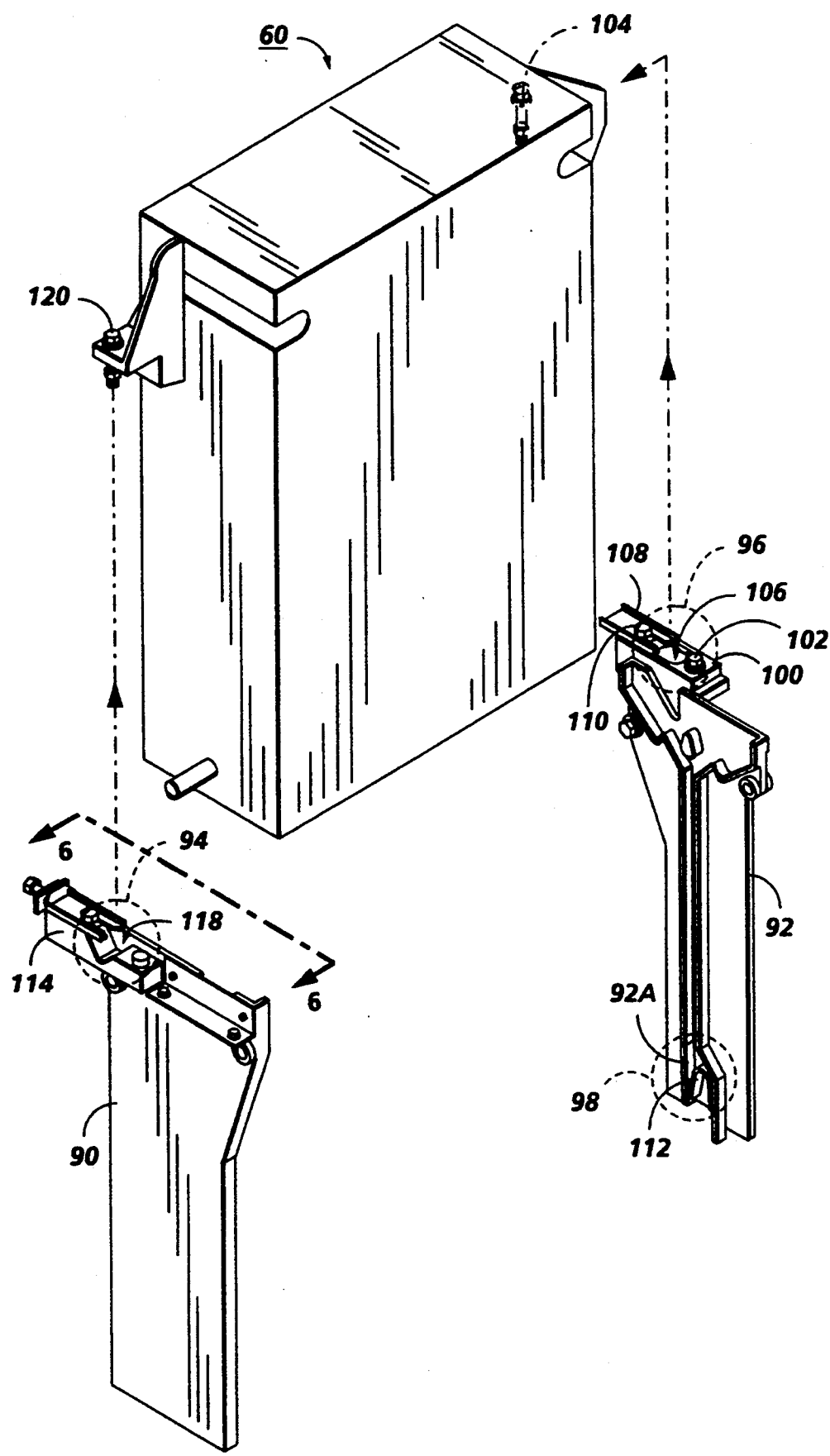
FIG. 4 is an exploded view of the ROS housing seated between walls of a printer frame.
Figure 5:
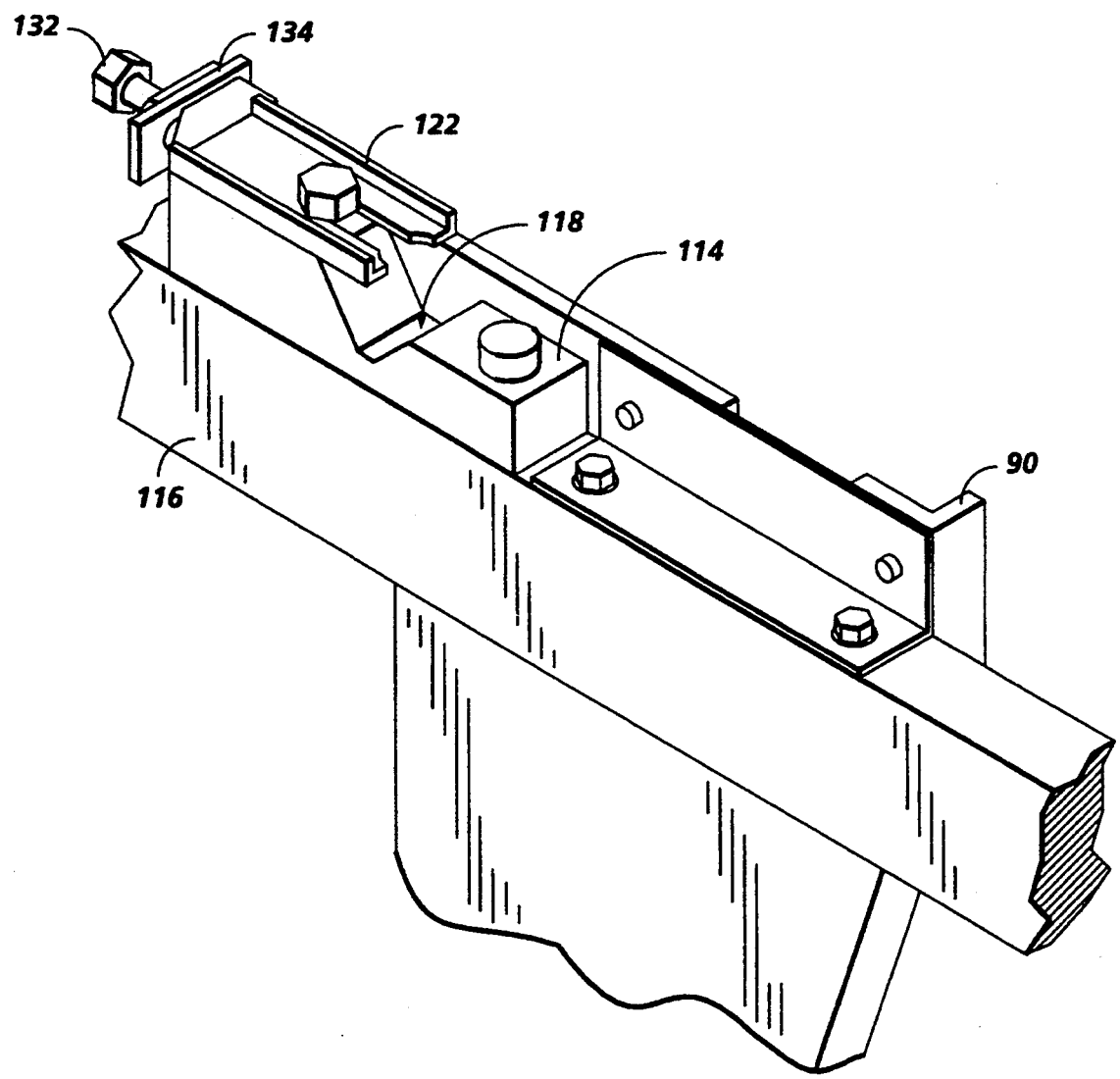
FIG. 5 is an enlarged perspective view of the adjustable mounting mechanism for the ROS housing of FIG. 4.

ROS housing 60 is mounted within printer section 8 by a three point mounting arrangement, best shown in FIGS. 4 and 5. FIG. 4 shows outboard and inboard machine frames 90, 92 forming the front and rear walls of printer section 8. Circled areas 94, 96, 98 identify those areas of frames 90, 92 which interface with and support the ROS housing 60. Considering first area 96, an inboard block 100 is fixedly attached to the top of frame 92 by screw 102. A ball stud 104, connected to the inboard end of the ROS housing, seats within conically shaped groove 106 and is held in place by clamp 108. Clamp 108 is movable laterally and engages the side of stud 104 to maintain it in its fixed, seated position. Clamp 108 is secured to the block 100 by screw 110.

Considering next the circled area 98, the bottom right corner of housing 60 is designed to be engaged between a lateral spring 112 and a facing surface 92A.

Figure 6:
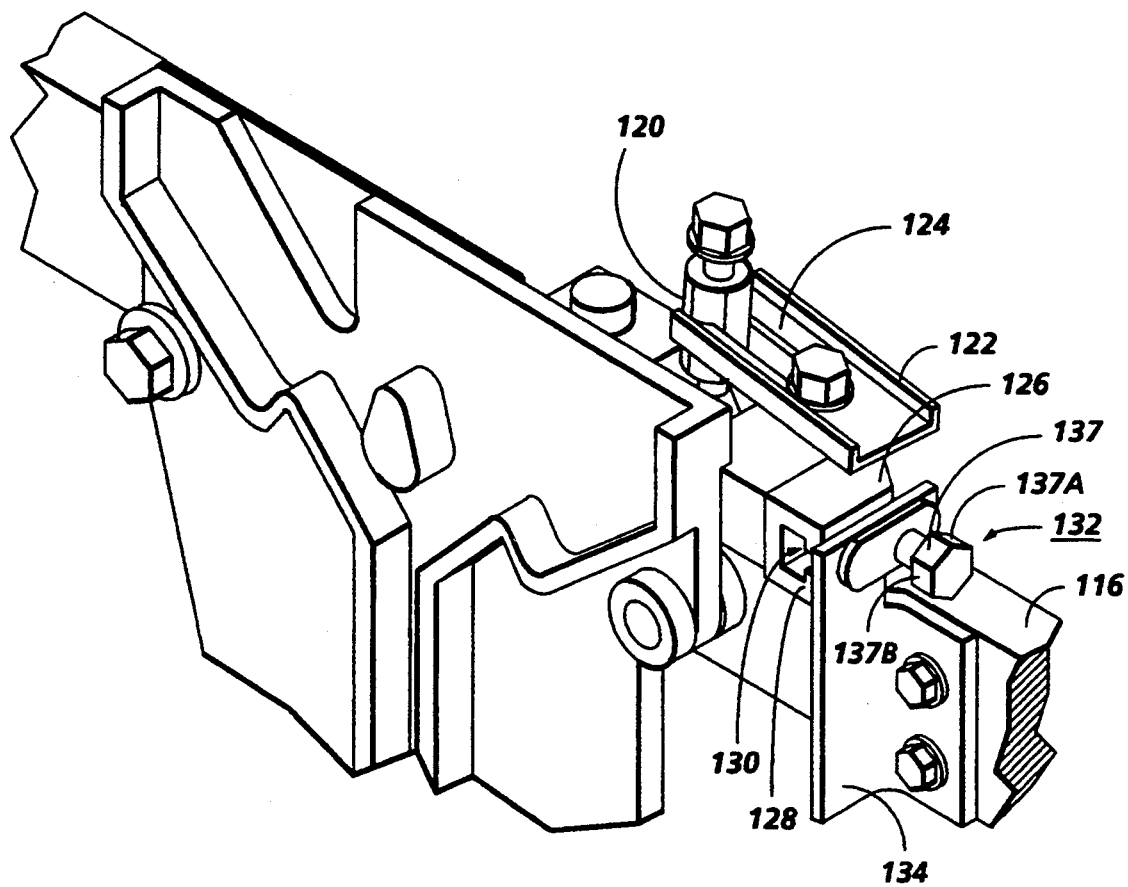
FIG. 6 is an enlarged view of the opposite side of the mechanism shown in FIG. 5.

Turning finally to circled area 94, shown in FIG. 4 and in two enlarged views in FIGS. 5 and 6, a second, outboard block 114 is slidably mounted on a rail 116, formed at the top of frame 90. A V-shaped notch 118 is formed in block 114, which seats a second, outboard ball stud 120, attached to the outboard side of the housing. Clamp 122 is movable laterally and engages the side of stud 120 to maintain it in its seated position within notch 118. Clamp 122 is secured to block 114 by screw 124.

Figure 7:
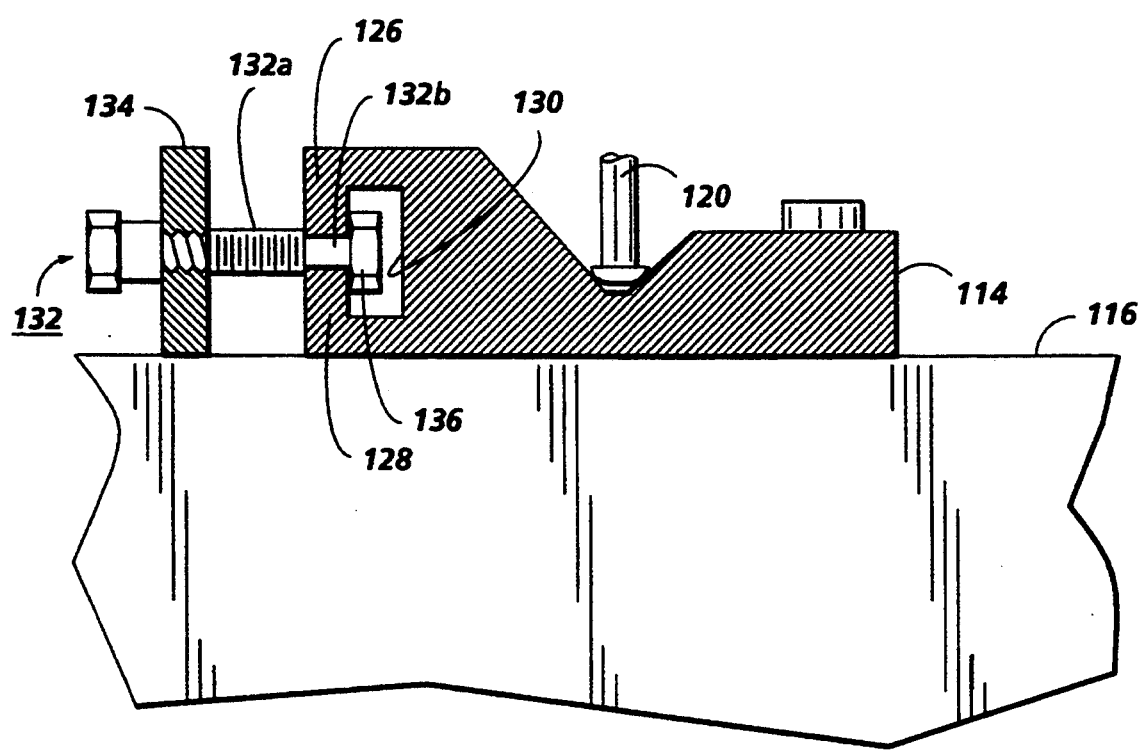
FIG. 7 is a side view of the mechanism shown in FIG. 5.

Summarizing the above description, the ROS housing 60 is mounted vertically between frames 90, 92, with the weight of the housing being borne at interface areas 94, 96. Lateral movement of the bottom half of the ROS housing is restrained by spring 112 acting against machine frame 92A at area 98. This three point mounting provides the vertical ROS-to-belt spacing within required tolerance. However, each belt architecture used in each printer 2 will be slightly different with the potential for belt misalignment in the skew (process) direction. Provision is made for allowing scan line skew adjustment by moving block 114 along guide rail 116, while allowing ball stud 104 to pivot within groove 106. The mechanism for accomplishing this is shown in the enlarged view of FIGS. 5, 6, and 7. As best shown in FIGS. 6 and 7, one end of block 114 terminates in two L-shaped jaw like members, 126, 128, forming a T-shaped aperture 130 within the block. An adjustment screw 132 has a threaded portion 132A, which is threadingly engaged through threaded plate 134, fixedly attached to rail 116. The screw has a second, non-threaded section 132B which is held in contact between jaw members 126, 128. The end of the screw 132 terminates in a lug 136. The head of screw 132 is formed with a number of hex flats, 137, 137A, 137N, etc., for purposes described below. It will be apparent that, as the screw is turned, for example, clockwise in FIG. 7, threaded portion 132A will exert a lateral force on block 114, moving it to the right. Counterclockwise rotation of screw 132 will cause lug 136 to engage the inner surface of jaw members 126, 128, sliding block 114 to the left. This adjustment mechanism enables a very precise positioning of the ROS housing to compensate for belt skew misalignment, as will be seen in the examples below.

ADJUSTMENT EXAMPLE

Figure 8:
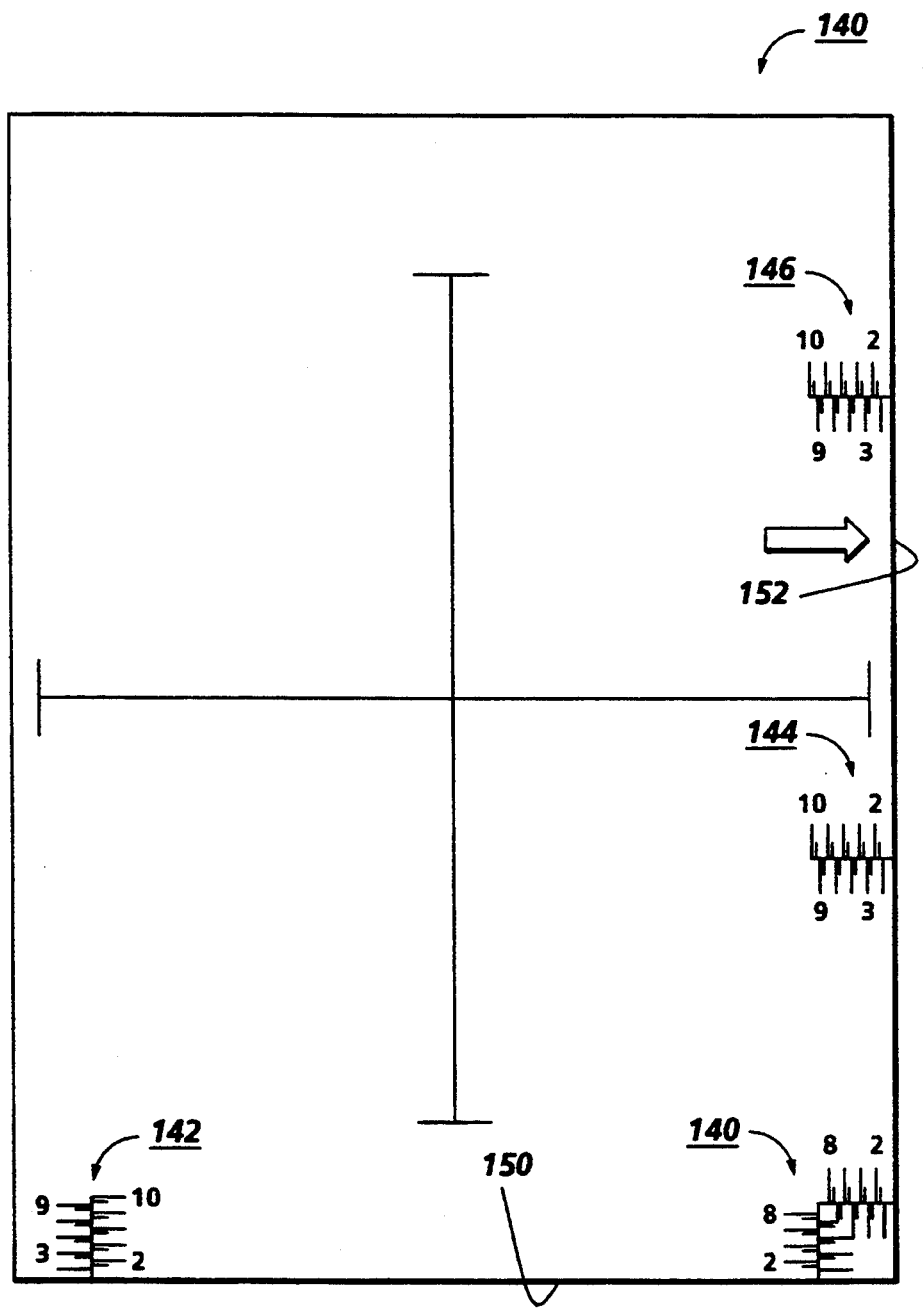
FIG. 8 shows a test pattern output print used to determine scan line skew adjustment.

It is assumed that a ROS 52 and a print module 56 have been initially positioned within printer section 8 (FIG. 1). A ROS housing 60 has been placed into an initial seated position, which is outside tolerances set for image scan line skew with photoreceptor 62. Controller 7 is modified to allow an operator tech rep to generate a skew test pattern print signal from interface 42. Video signals from image adjust output control circuit 50 drive the ROS 52 to form a plurality of test pattern images on the photoreceptor, which are then printed out as successive copies, using the xerographic processes described in the previously referenced application 07/546,617. A typical test pattern print 140 is shown in FIG. 8. As shown, there are a pair of register edge skew delineators 140, 142 with incremental marks 140-1 through 140-10 and 142-1 through 142-10. there are also a pair of lead edge skew delineators 144, 146, with incremental marks 144-1 through 144-10 and 146-1 through 146-10. Using a 150 mm scale graduated to 0.5 mm and an eye loop, the print is measured for registration and lead edge skew to the nearest 0.1 mm. For example, two registration edge measurements are made, for example, between marks 140-8 and 142-8 to the register edge 150 of print 140. The difference between the two measurements is the registration error introduced by the paper feed path of the test pattern print. Lead edge skew measurements are then made from, for example, marks 144-8 and 146-8 to lead edge 152 of print 140. The difference between these two measurements is the lead edge skew. The registration edge skew (if any) is subtracted from this value to arrive at the scan line skew. This value is an indication that the belt 62 is skewed, so that the lead edge of an image frame, as represented by print 140, will be skewed in either the process (+) direction or in a direction opposite to (−) the process direction. An appropriate adjustment must then be made to the ROS housing to move the output beam 54 to compensate for the scan line skew. Inboard clamp 108 has been loosened, allowing ball stud 104 to pivot within groove 106. Outboard clamp 122 has been removed and the screws in block 114 have been loosened. This adjustment is made by turning adjustment screw 132 in the clockwise (+) or counterclockwise (−) direction. The adjustment could be made by an iterative process, with subsequent prints being made and examined to determine whether scan line skew has been eliminated. However, according to another feature of the present invention, a correlation has been made between the rotation of hex flat increments 137A, 137B, 137N of screw 132 and the desired skew measurement.

The following Adjustment Table is based on measurements taken from the test pattern document over a span of 200 mm. One increment of the adjustment screw hex flat equates to a 0.082 mm correction over the 200 mm distance. The number in the left column is the calculated scan line skew derived from the above procedure. The number in the corresponding right column identifies the number of hex flats on adjustment screw 132 to increment (CW or CCW), to bring the scan line skew contribution to lead edge skew to approximately zero.

ADJUSTMENT TABLE

| SCAN LINE SKEW (mm) | HEX FLAT INCREMENTS CW/CCW |
| --- | --- |
| 0.08 | 1 |
| 0.16 | 2 |
| 0.25 | 3 |
| 0.33 | 4 |
| 0.41 | 5 |
| 0.50 | 6 |
| 0.57 | 7 |
| 0.66 | 8 |
| 0.74 | 9 |
| 0.82 | 10 |
| 0.90 | 11 |
| 0.98 | 12 |
| 1.07 | 13 |
| 1.15 | 14 |
| 1.23 | 15 |
| 1.31 | 16 |
| 1.39 | 17 |

-continued

ADJUSTMENT TABLE

| SCAN LINE SKEW (mm) | HEX FLAT INCREMENTS CW/CCW |
| --- | --- |
| 1.48 | 18 |
| 1.56 | 19 |
| 1.64 | 20 |
| 1.72 | 21 |
| 1.80 | 22 |
| 1.89 | 23 |
| 1.97 | 24 |
| 2.05 | 25 |

Assume, for example, that the difference between the registration edge measurements taken at registration edge delineators 140 and 142 is (−0.25 mm) and that the difference between the measurements taken at the lead edge delineators 144, 146 is zero. For this case, the scan line skew = (lead edge skew − reg. edge skew) = (0 − (−0.25)) = +0.25 mm. For this value, the ROS is pivoted in the CW direction with respect to the P/R. From the table, screw 132 is rotated through 3 hex flat increments. As shown in FIGS. 4 and 5, clockwise rotation moves the block 114 to the right, causing housing 60 to pivot about inboard interface 96. When the 3 flat increments have been made, the block is resecured to the guide rail, clamp 122 is replaced, and inboard clamp 108 is retightened.

The above example assumed an initial installation of a ROS to photoreceptor. However, the procedures are equally applicable to adjustments which may be required after initial alignment, and after some period of operation during which the photoreceptor experiences misalignment due to various mechanical wear factors, or parts replacement, or if a ROS is replaced in the field.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. A method for compensating for scan line (image) skew in a printing machine incorporating a Raster Output Scanning (ROS) system containing a plurality of optical components including the steps of:
  (a) positioning the optical plurality of components of the ROS, within a housing,
  (b) securing the housing to a printing machine frame at a plurality of mounting locations including at least a first, top, inboard pivotable location, and a second, top, outboard mount laterally adjustable location,
  (c) positioning a photoreceptor member adjacent the output beams generated by said ROS housing so that the ROS output beams are formed in successive, parallel scan lines on said photoreceptor, said photoreceptor moving in a process direction,
  (e) applying a skew test pattern signal to the ROS to create a latent test pattern image on said photoreceptor,
  (f) developing said latent test pattern image to form a developed image and transferring said developed image to a copy sheet,
  (g) fusing said copy sheet to create a final test pattern print having a plurality of lead edge and registration edge skew delineators, (h) calculating lead edge and registration edge skew, (i) subtracting registration edge skew from lead edge skew to determine resultant scan line skew which represents a skewing of the photoreceptor in either the process or reverse process direction, and (j) laterally adjusting said top outboard mount location.

2. In a printing system including a Raster Output Scanner (ROS) comprising a plurality of optical components which scans a charged surface of a photoreceptor moving in a process direction in response to input video data signals to form image scan lines on said photoreceptor, and wherein the optical components comprising said ROS are contained within a generally rectangular optical housing which is vertically mounted in a printer frame in alignment with said photoreceptor, so as to couple output scan beams from the ROS onto the charged photoreceptor surface, said housing having an inboard end and an outboard end, the improvement wherein the inboard end of the ROS housing is pivotably mounted to said printer frame, with the outboard end being adjustably mounted to said printer frame, so as to enable the ROS housing to be pivoted with respect to said process direction, whereby any scan line skew caused by ROS to photoreceptor misalignment is compensated for.

3. A mounting mechanism for adjusting skew of output scan lines formed on a surface of a photoreceptor moving in a process direction by a ROS, said ROS comprising a plurality of optical components secured within a generally rectangular modular housing, the mechanism including:

(a) a machine frame providing a first, second, and third mounting interface for the housing, said first and second interfaces supporting the housing, and wherein the third interface maintains a vertical orientation of the housing, said first interface further permitting a pivoting rotation of the housing thereabout, said second interface including a skew adjustment mechanism for moving one end of the housing in a process or reverse process direction in conjunction with said pivoting rotation, and (b) means for determining an amount of adjustment required to adjust for said skew.

4. The mechanism of claim 3 wherein said skew adjustment mechanism includes a block member adapted to seat the outboard end interface of the housing, said block member slidably movable on a surface of a guide rail formed on said machine frame, and a horizontally mounted screw operatively connected to said block member, so as to move said block member and hence, said ROS housing in a first or second lateral direction, depending upon a given screw rotation direction, said first or second lateral direction corresponding to the process or to a non-process direction, respectively.

5. The mechanism of claim 3 wherein said first and second interfaces each include a ball stud, seated within a mating depression, formed within said block member.

6. The mechanism of claim 4 wherein a head of said horizontally mounted screw has a plurality of hex flats, each hex flat associated with a specific scan line skew adjustment.

* * * * *